United States Patent
Hsiao et al.

(10) Patent No.: US 6,416,935 B1
(45) Date of Patent: Jul. 9, 2002

(54) METHOD FOR FORMING THE AIR BEARING SURFACE OF A SLIDER

(75) Inventors: Yiping Hsiao; Cherngye Hwang, both of San Jose; Ciaran A. Fox, Sunnyvale; Richard Hsiao, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 09/632,860

(22) Filed: Aug. 7, 2000

(51) Int. Cl.[7] ............................................... G03F 7/00
(52) U.S. Cl. ....................................... 430/320; 360/122
(58) Field of Search ................................. 430/311, 313, 430/320, 322; 360/102, 103, 122

(56) References Cited

U.S. PATENT DOCUMENTS

| | | | |
|---|---|---|---|
| 4,130,847 A | 12/1978 | Head et al. | 360/122 |
| 5,023,738 A | 6/1991 | Prenosil | 360/122 |
| 5,118,577 A | 6/1992 | Brar et al. | 428/409 |
| 5,151,294 A | 9/1992 | Bleich et al. | 427/11 |
| 5,159,508 A | 10/1992 | Grill et al. | 360/103 |
| 5,175,658 A | 12/1992 | Chang et al. | 360/103 |
| 5,271,802 A | 12/1993 | Chang et al. | 156/643 |
| 5,805,380 A | 9/1998 | Ishihara et al. | 360/103 |
| 5,841,608 A | 11/1998 | Kasamatsu et al. | 360/103 |
| 5,858,182 A | 1/1999 | Horng et al. | 204/192.16 |

FOREIGN PATENT DOCUMENTS

| | | | | |
|---|---|---|---|---|
| EP | WO 96/19803 | 6/1996 | | G11B/5/60 |
| JP | 60-136025 | 7/1985 | | G11B/5/60 |
| JP | 406012615 A | 1/1994 | | G11B/5/187 |
| JP | 406150599 A | 5/1994 | | G11B/21/21 |
| JP | 409212836 A | 8/1997 | | G11B/5/60 |

*Primary Examiner*—Kathleen Duda
(74) *Attorney, Agent, or Firm*—Robert B. Martin

(57) ABSTRACT

The invention relates to a method for producing magnetic sliders having a permanent protective coating of carbon over the air bearing surface. The method comprises the steps of: (a) depositing a protective coating on a surface of the slider, the protective coating comprising an underlayer of carbon and a top layer selected from silicon and titanium; (b) depositing a photoresist layer onto the protective coating; (c) imagewise exposing the photoresist layer to radiation; (d) developing the image in the photoresist layer to expose the protective coating; (e) transferring the image through the protective layer and into the slider to form the air bearing pattern in the slider; and (f) removing the top layer of the protective coating.

8 Claims, 2 Drawing Sheets

METHOD FOR FORMING THE AIR BEARING SURFACE OF A SLIDER

BACKGROUND OF THE INVENTION

1. Field of the Invention

The present invention relates to an improved method for the manufacture of sliders. More particularly, the invention relates to an improved method for forming the air bearing surface (ABS) of a slider.

2. Description of the Background Art

Digital magnetic recording devices for data storage generally comprise a thin film magnetic recording disk and a head or transducer which is moved above the surface of the rotating disk to electromagnetically read and write information on the disk. Advanced thin film magnetic recording disks generally comprise a rigid substrate, a magnetic layer such as a cobalt-based metal alloy, a protective amorphous carbon layer and a lubricant layer, such as a perfluoropolyether disposed on the carbon overcoat.

During operation of the disk drive system, an actuator mechanism moves the magnetic transducer to a desired radial position on the surface of the rotating disk where the head electromagnetically reads or writes data. Usually, the head is integrally mounted in a carrier or support referred to as a "slider". A slider generally serves to mechanically support the head and any electrical connections between the head and the rest of the disk drive system. The slider is aerodynamically shaped to glide over moving air and, therefore, to maintain a uniform distance from the surface of the rotating disk, thereby preventing the head from undesirably contacting the disk.

Typically, a slider is formed with an aerodynamic pattern of protrusions (air bearing pattern) on the air bearing surface (ABS) which enable the slider to fly at a constant height close to the disk during operation of the disk drive.

The recording density of a magnetic disk drive is limited by the distance between a transducer and the magnetic media. One goal of air bearing slider design is to "fly" a slider as closely as possible to a magnetic medium while avoiding physical impact with the medium. Smaller spacings, or "fly heights", are desired so that the transducer can distinguish between the magnetic fields emanating from closely spaced regions on the disk.

In manufacturing such read/write heads, a large number of sliders are fabricated from a single wafer having rows and columns of the magnetic transducers deposited simultaneously on the wafer surface using semiconductor-type process methods. In one process embodiment, after deposition of the heads is complete, the wafer is cut into four quadrants. Each quadrant is then bonded to a lapping fixture and grounded on a lapping plate to provide accurate head dimensions. After lapping, single row bars of sliders in side by side orientation are cut from the wafer quadrant. These row bars can optionally be lapped again, and the ABS design is formed in each slider using art-known lithographic and dry etching techniques. The ABS is formed by coating the slider surface with a thick layer of protective photoresist, imaging the photoresist with radiation; development of the ABS image in the photoresist and dry etching (transferring) the ABS image into the body of the slider. After the ABS has been formed, the remaining photoresist is removed by solvent or soda blast. Lastly, the row bars are adhered to suitable tape; and each bar is diced, i.e., separated with a diamond-cut saw into individual sliders, each having a magnetic head terminating at the ABS. Each slider is then attached to an actuator for use in a magnetic disk drive.

It has been determined that damage can occur to the thin film magnetic sensor during the above described process steps. Grill et al. in U.S. Pat. No. 5,159,508, disclose a dry process for forming a protective coating over the slider prior to the lithographic process. The protective coating comprises two layers, the first layer an adhesion layer, e.g. silicon and a second layer of amorphous carbon. The ABS is then formed in the slider covered with the protective coating. Grill teaches that protective coating should be permanently retained on the slider because the top layer of protective carbon will protect the slider from mechanical damage during subsequent normal operation of the slider. Unfortunately, due to pinholes and defects in the photoresist layer, the carbon layer of the protective coating is, in some cases, damaged during the etching process. This damage to the carbon layer can cause corrosion of the sensor resulting in diminished signal amplitude during operation of the disk drive. Chang et al. U.S. Pat. No. 5,271,802, teaches a similar process where the top layer of the protective coating of the slider is silicon oxide. Although silicon is not as easily damaged as carbon during the etching process, silicon oxide is not a suitable protective coating for sliders because of its relatively poor wear resistance.

Therefore, there is still a need in this art for a slider manufacturing process which results in sliders having suitable permanent protective coatings over the ABS.

It is, therefore, an object of the present invention to provide an improved method for the manufacturing of magnetic sliders. Other objects and advantages will become apparent from the following disclosure.

SUMMARY OF THE INVENTION

The present invention relates to a method for producing magnetic sliders having a permanent protective coating of carbon over the ABS. The method generally comprises the steps of: (a) depositing a protective coating on a surface of the slider, the protective coating comprising an underlayer of carbon and a top layer selected from silicon and titanium; (b) depositing a photoresist layer onto the protective coating; (c) imagewise exposing the photoresist layer to radiation; (d) developing the image in the photoresist layer to expose the protective coating; (e) transferring the image through the protective layer and into the slider to form the air bearing pattern in the slider; and (f) removing the top layer of the protective coating.

The method provides a slider having uniform protective coating of carbon over the ABS surface of the slider.

A more thorough disclosure of the present invention is presented in the detailed description which follows and the accompanying figures.

DETAILED DESCRIPTION OF THE INVENTION

Figure 1:
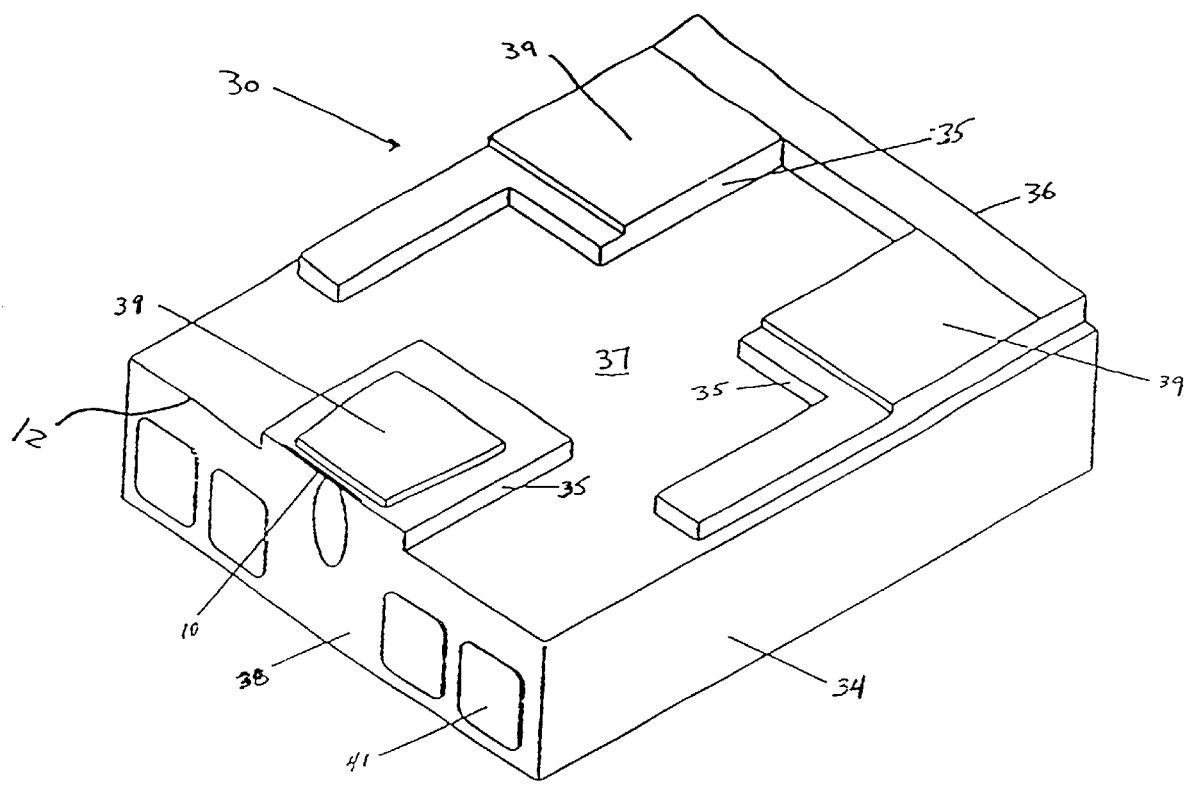
FIG. 1 is a perspective view of a slider.

The present invention relates to an improved method for the manufacture of sliders. Referring to FIG. 1, there is shown a typical thin film head slider 30 with a negative pressure ABS. The slider 30 is generally rectangular in shape. It consists of two portions, i.e., a slider portion and a head portion, formed on an end face of the slider portion. Typically, this end face of the slider constitutes the slider trailing surface when the slider is suspended above and adjacent a rotating recording disk.

The slider portion 34, which constitutes the bulk of the thin film head slider 30, is made of a ceramic material such as $Al_2O_3$—TiC (e.g., N58), or other suitable material. In one embodiment, the ABS of the slider comprises, as shown, three dual depth step-pads 35 having top surface 39 and disposed on a recessed face 37 of the slider 30. Two step-pads are at the leading edge 36 and one is at the trailing edge 12. The head portion 10 is suitably located on the single step-pad near the trailing surface 38 of the slider 30. The step pads 35 and the recessed face 37 are all important structural features which enable the head portion 10 to glide a short distance above the surface of a magnetic disk. A variety of other ABS designs are known in the art, such as disclosed in U.S. Pat. No. 5,650,893 (for negative pressure design) and U.S. Pat. No. 4,894,740 (for positive pressure design), the disclosures of which are incorporated herein by reference.

The head is typically encapsulated in a thin layer of alumina deposited on the trailing surface of the slider. Suitably, it is a magnetoresistive read element and inductive head for writing data. Electrical terminal pads 41 provide electrical connection for the magnetic head element.

Figure 2:
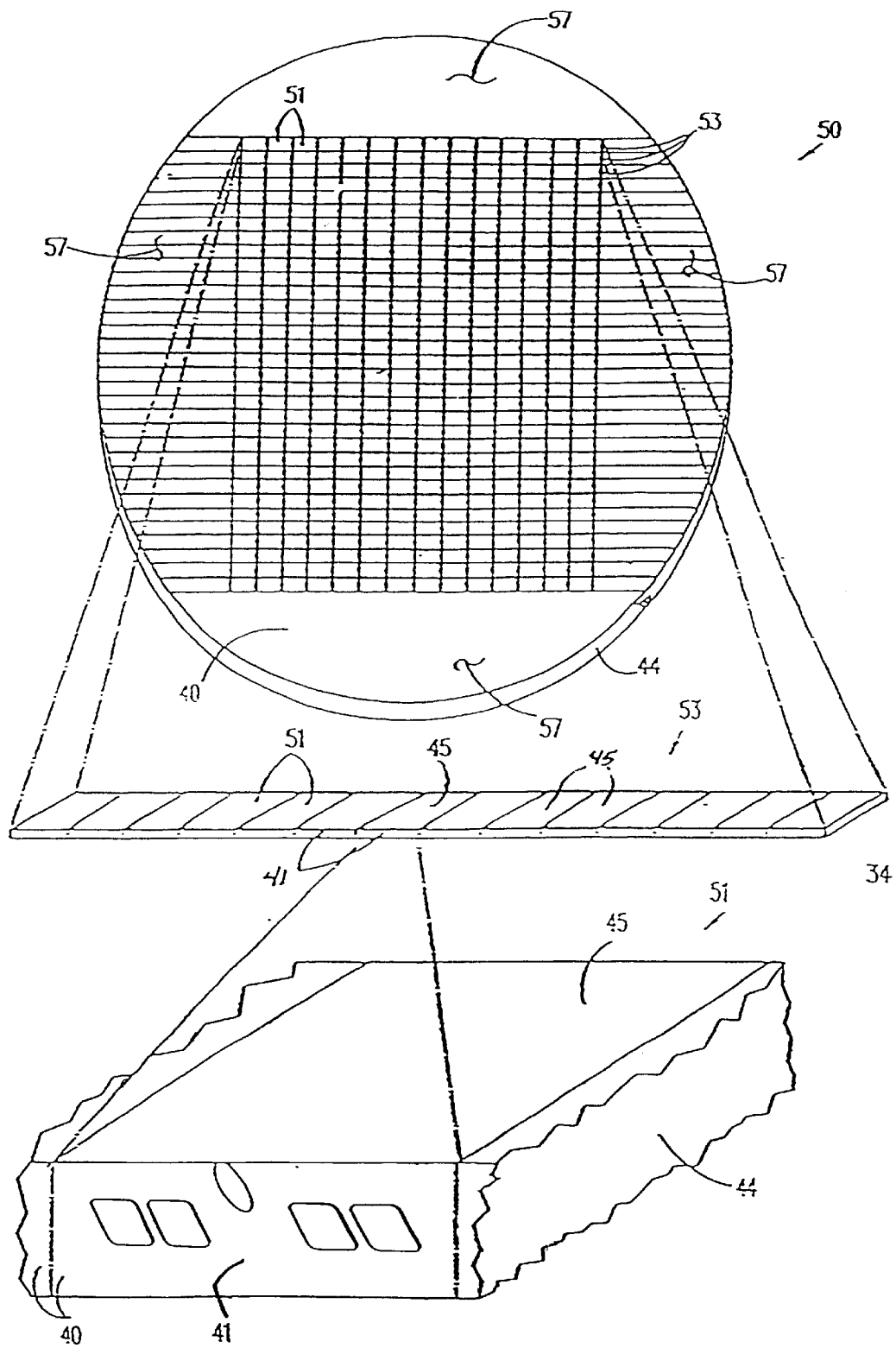
FIG. 2 is a perspective view of a wafer element having a plurality of magnetic heads fabricated thereon in rows and depicting the detailed structure of a row and a slider.

Referring to FIG. 2, the above-described thin film head slider 30 has been fabricated from a preprocessed wafer 50, as shown in FIG. 2, or from a wafer quadrant. The wafer 50 comprises a wafer substrate 44 which is suitably covered by thin layer 40 of alumina. The magnetic head device such as an MR head is formed in the layer 40. The magnetic heads are arranged in rows and columns are suitably identically oriented. Typically, the thickness of the wafer substrate 44 is equal to the length of the finished slider 30.

The wafer 50 comprises a matrix of slider units 51 arranged in rows 53 which when fully processed will become sliders 30. The view shown in FIG. 2 is an end view of the individual slider units 51 with the magnetic heads having been formed on the ends of the slider units 51. As shown in FIG. 2, a plurality of identical row bars 53, each comprising a row of identical slider units 51, together with superfluous sections, such as top and bottom sections 57 where no slider units are formed constitute the wafer 50. Slider row 53 has trailing surface 41 and a top surface 45 which will be modified to form the ABS. The wafer may be fabricated to contain any desirable number of rows 53 of slider units 51 and any desirable number of slider units 51 in each row, depending on the size of the wafer and the size of the sliders.

The slider unit 51 shown in FIG. 2 is identical with the finished slider 30 shown in FIG. 1, except that the ABS is not yet formed and the throat height for the poles and the head elements are greater in the unfinished slider unit 51. The wafer is preferably cut into four quadrants and each quadrant is lapped to obtain the desired throat and element heights. The desired throat heights and head element heights are achieved by the provision of lapping guides. The lapping guides are then used as indicators of element height during the lapping process for the slider units 51. The final height of the element may be determined by measuring the resistance of the element itself. See, for example, U.S. Pat. Nos. 4,914,868 and 4,912,883, the disclosure of which are incorporated herein by reference for all purposes.

When fabrication of the magnetic heads on the sliders is complete at the quadrant level, the quadrant is sliced into rows of the slider. In an alternative embodiment, the wafer can be first sliced into rows, and then the individual rows can be lapped to achieve desired throat and element heights.

According to the present invention, at a time after the heads are lapped to the selected throat height and before the ABS pattern is produced on the slider, a protective coating is formed over the slider. The protective coating suitably comprises two layers. The first layer is an underlayer of carbon, suitably an amorphorus hydrogenated carbon. The protective coating is effective to protect the thin film magnetic head during the processing of the head/slider to form the pattern of rails on the ABS.

Further, The carbon underlayer is a permanent layer and is therefore effective during subsequent normal operation of the head in a magnetic disk file, for example, to protect the head and the ABS from mechanical wear caused by inadvertent contact between the head/slider and the magnetic recording medium during flying. In addition to mechanical wear, the carbon layer also is effective to protect the variety of materials in the magnetic head that are attacked by the normal constituents of the atmosphere from oxidation and corrosion in normal operation of the system.

The layer of hydrogenated amorphous carbon is deposited to a thickness of about 20–70 angstroms. A layer of hydrogenated amorphous carbon as little as 50 angstroms thick has been shown to provide a significant improvement in both wear and corrosion rates. However, a thicker layer is preferable since it provides increased protection, so the thickness is chosen based on the permissible increase in spacing between the magnetic head and the magnetic recording medium.

The layers of the protective coating can be deposited by any suitable technique such as ion beam deposition, CVD or sputtering e.g. RF magnetron sputtering.

The deposition parameters of the amorphous hydrogenated carbon layer determine the characteristics of the layer since hydrogen content, density, hardness, and optical density are a function of the sputtering power, the percent hydrogen in the argon carrier gas and the pressure. Suitable deposition technique and conditions are known to those skilled in the art.

In an alternative embodiment, a thin adhesion layer of silicon is first applied to the surface of the slider to enhance the adhesion of the carbon layer to the slider. The silicon layer is suitably about 10 to about 50 Å thick.

The top layer of the protective coating suitably comprises silicon or titanium.

Suitably, the top layer is deposited by sputtering to a thickness of about 50 to 150 Å. The top layer functions to protect the carbon underlayer from damage during the subsequent lithographic, etching, and resist removal process steps.

A thick layer of a photoresist material is then deposited over the protective coating 22. The photoresist material is exposed through an appropriate mask in a pattern of the chosen ABS rail configuration, developed and removed in the exposed areas. The remaining photoresist material serves as a mask for forming the chosen rail pattern on ABS.

The masked row of sliders is then subjected to a suitable material removal process such as by sputter etching, by reactive ion etching, by ion milling, or laser etching. (see U.S. Pat. No. 4,301,353). Preferably, the etching is done by ion milling or reactive etching. During the etching process, the unmasked portion of protective coating is removed first, and the underlying area of the slider is then removed to a depth which is chosen to provide the desired flying characteristics for the slider. The remainder of the photoresist mask is then removed by a suitable solvent or by a soda blast resist removal process. For more complex ABS patterns with multiple step levels, the lithographic etch step may be repeated.

The material forming the top layer of the protective coating is chosen so that (i) it does not react with the material chosen for removing the layer of photoresist material and (ii) can be selectively removed from the carbon underlayer.

The top layer of the protective coating acts as a sacrificial layer to protect the permanent carbon underlayer during the slider processing, e.g. lithographic/etch/resist removal processes. At the end of processing, a top silicon layer is removed selectively from carbon layer by a selective gas etchant such as XeF2 or a liquid base solution such as KOH.

Alternatively, a titanium top layer is removed selectively from carbon layer by a selective liquid etchant containing $H_2O_2$. Since the carbon layer is protected during processing, its integrity is maintained. The carbon layer will be smooth and with no damage from the process steps.

The row of sliders is then suitably debonded from the carrier and bonded to an adhesive tape for the dicing process where vertical cuts are made in the row to separate each individual slider.

The method of the present invention results in sliders having a suitable protective carbon coating over the top portions of the ABS of the slider such as the rails. The process also provides protection to the slider and the sensitive thin film magnetic elements during manufacturing to provide greater yields.

Although this invention has been described with respect to specific embodiments, the details thereof are not to be construed as limitations, for it will be apparent that various embodiments, changes and modifications may be resorted to without departing from the spirit and scope thereof; and it is understood that such equivalent embodiments are intended to be included within the scope of this invention.

We claim:

1. A method for forming an air bearing pattern in a surface of a magnetic head slider comprising:

(a) depositing a protective coating on a surface of the slider, the protective coating comprising a layer of carbon and a top layer selected from silicon and titanium.

(b) depositing a photoresist layer onto the protective coating;

(c) imagewise exposing the photoresist layer to radiation;

(d) developing the image in the photoresist layer to expose the protective coating;

(e) transferring the image through the protective coating and into the slider to form the air bearing pattern in the slider;

(f) removing the remaining photoresist layer; and (G) removing the entire top layer of the protective coating.

2. The method of claim 1 wherein the top layer of the protective coating is silicon.

3. The method of claim 2 wherein the top layer is removed by contact with a strong base.

4. The method of claim 3 wherein the base is potassium hydroxide.

5. The method of claim 2 wherein the top layer of protective coating is removed by gas etching with xenon fluoride.

6. The method of claim 1 wherein the top layer of the protective coating is titanium.

7. The method of claim 6 wherein the top layer is removed by a liquid etchant.

8. The method of claim 7 wherein the liquid etchant is hydrogen peroxide.

* * * * *